United States Patent

Nakagawa et al.

[11] Patent Number: 6,155,924
[45] Date of Patent: *Dec. 5, 2000

[54] VIDEO GAME MACHINE, VIDEO GAME METHOD, AND COMPUTER-READABLE MEDIUM ON WHICH VIDEO GAME PROGRAM IS RECORDED

[75] Inventors: Eiji Nakagawa, Kakogawa; Yasuo Okuda, Moriguchi, both of Japan

[73] Assignee: Konami Co., Ltd., Hyogo-ken, Japan

[*] Notice: This patent is subject to a terminal disclaimer.

[21] Appl. No.: 09/323,769

[22] Filed: Jun. 1, 1999

[30] Foreign Application Priority Data

Jun. 3, 1998 [JP] Japan ................... 10-154957

[51] Int. Cl.[7] ........................ G06F 19/00
[52] U.S. Cl. ........................ 463/4; 463/2
[58] Field of Search .................. 463/23, 2, 3, 4

[56] References Cited

U.S. PATENT DOCUMENTS

| | | | |
|---|---|---|---|
| 5,462,275 | 10/1995 | Lowe et al. | 273/94 |
| 5,601,487 | 2/1997 | Oshima et al. | 463/4 |

FOREIGN PATENT DOCUMENTS

| | | | |
|---|---|---|---|
| 07155463 | 6/1995 | Japan | A63F 9/22 |
| 7-155463 | 6/1995 | Japan . | |
| 7-275520 | 10/1995 | Japan . | |
| 9-140938 | 6/1997 | Japan . | |
| 0844580 | 5/1998 | Japan . | |

OTHER PUBLICATIONS

Tim Chown: "Premier Manager 97" Online!, May 1997 (1997–05), pp. 1–9, XP002115838 Retrieved from the Internet: <URL:http://www.gamesdomain.com/gdrview/zones/reviews/pc/may97/pm97.html> retrieved on 1999–09–17!

"Mycom Basic Magazine" Sep. 6, 1996, published on Jun. 1, 1990 by Denpashinbunsha.

FIFA Soccer 97. GameSpot:FIFA Soccer 97 Printable Review [online]. Dec. 19, 1996, [retrieved on Feb. 2, 2000]. Retrieved from Internet: <URL:gamespot.com.au/sports/fifa97/printable_review.html>.

Primary Examiner—Michael O'Neill
Assistant Examiner—Julie Kasick
Attorney, Agent, or Firm—Jordan and Hamburg LLP

[57] ABSTRACT

Motivation is provided for a game character in accordance with the situation or the progress of a game, and is reflected in the character's operation. In a game machine, a character displayed on a monitor screen performs various game-related operations in response to an instruction provided from a controller. The game machine includes a situation determining portion for determining whether a predetermined game-related situation has occurred. A motivation-level setting portion sets the motivation level, influencing the character's operation, in response to an occurrence of the situation. An operation control portion controls the character to operate in response to the set motivation level. In this manner, the motivation level is provided for the character in accordance with an occurrence of the situation, and the character is operated with the characteristics and the ability corresponding to the provided motivation level.

14 Claims, 10 Drawing Sheets

VIDEO GAME MACHINE, VIDEO GAME METHOD, AND COMPUTER-READABLE MEDIUM ON WHICH VIDEO GAME PROGRAM IS RECORDED

BACKGROUND OF THE INVENTION

1. Field of the Invention

The present invention relates to video game systems (machines) using, for example, a cassette-type recording medium, such as an optical disc, a magnetic disk, or a semiconductor memory, on which program data concerning, for example, a soccer game is recorded. The invention also relates to a video game method for use in the above type of system and to a computer-readable recording medium on which a game program implementing the above method is recorded.

2. Description of the Related Art

Hitherto, many kinds of video game systems have been proposed. For example, one type of video game system is formed of a home-use game machine and a television monitor. Another type of video game system is a commercial-use game machine consisting of a personal computer or a workstation, a display unit, and a sound output device. Each of the above systems includes a controller operated by a game user, a recording medium on which game program data is recorded, a central processing unit (CPU) that controls the elements of the system to produce sound and images based on the game program data, a processor for creating images, a processor for producing sound, a cathode ray tube (CRT) monitor for displaying images, and a speaker for outputting sound. As the above-described recording medium, a compact disc-read only memory (CD-ROM), a semiconductor memory, and a cassette that integrates a semiconductor memory are primarily used.

As the above type of game, various kinds of games are known, and one of these is a soccer game, in which a plurality of characters are displayed on a CRT screen and compete against each other. In the soccer game, a game user controls game characters (players) on the user side to perform actions, such as dribbling, passing, and shooting a ball, by operating a controller, thereby allowing the players to compete. Accordingly, the soccer game is a video game that has highly entertaining and competitive characteristics.

In conventional soccer games, however, a player on the user side is moved merely based on a predetermined game program in response to instructions provided by the user through the controller. Even if unexpected situations occur while the game is in progress, the player's operations are unconditionally controlled according to instructions from the controller. Thus, the above type of soccer game is far from the sense of playing the actual game, and thus appears less powerful and realistic.

Additionally, if the game is played in teams, the computer also operates the other characters (regardless of the players on the user side or the opponent players) merely based on predetermined game rules. In this way, the game lacks entertaining characteristics.

SUMMARY OF THE INVENTION

Accordingly, in view of the above background, it is an object of the present invention to provide a highly realistic, powerful, entertaining game machine and method in which motivations are appropriately provided for game characters in accordance with the progress of the game and such motivations are reflected in the character's movements, and also to provide a computer-readable recording medium on which a game program implementing the above method is recorded.

In order to achieve the above object, according to one aspect of the present invention, there is provided a video game machine for use in a game in which a character displayed on a monitor screen performs various game-related operations in response to an instruction provided from a controller. The video game machine includes situation determining means for determining whether a predetermined game-related situation has occurred. Motivation-level setting means sets a motivation level, which influences a character's operation, in response to the situation. Operation control means controls the character to perform an operation in response to the set motivation level.

According to another aspect of the present invention, there is provided a video game method for use in a game in which a character displayed on a monitor screen performs various game-related operations in response to an instruction from a controller. The video game method includes the steps of determining whether a predetermined game-related situation has occurred, setting a motivation level, which influences a character's operation, in response to the situation, and controlling the character to perform an operation in accordance with the set motivation level until another predetermined situation occurs to change the motivation level.

According to a further aspect of the present invention, there is provided a recording medium on which a computer-readable game program in which a character displayed on a monitor screen performs various game-related operations in response to an instruction from a controller is recorded. The game program includes the steps of determining whether a predetermined game-related situation has occurred, setting a motivation level, which influences a character's operation, in response to the situation, and controlling the character to perform an operation in accordance with the set motivation level until another predetermined situation occurs to change the motivation level.

With the above arrangement, regardless of whether a single character or a plurality of characters are provided, a plurality of game-related situations, in particular, important situations, which may be encountered before the start of the game or while the game is in progress have been set. If it is determined that one of the predetermined situations has occurred, the motivation level corresponding to the situation is provided for the character. Once the character is provided with the motivation level, it remains the same operation pattern with the characteristic and the capability (ability) corresponding to the provided motivation level until the motivation level is altered (until a new motivation level is provided). For example, the character is operated with an increased speed, starts moving very quickly (highly agile), or easily commits errors. Alternatively, according to the content of the game, all the instructions or the main instructions given to the character may be influenced by the motivation level. Therefore, there is a subtle variation in the character's movement in response to the situation or the progress of the game, which is, conventionally, unconditionally controlled by the controller, thereby providing a highly realistic and entertaining game to the user.

If the present invention is applied to a soccer game in which the user competes for scores obtained by shooting a ball item, a plurality of characters of the user team and a plurality of characters of the opposing team are provided. The controller provides an instruction to one of the characters of the user team who is in possession of the ball item, and the computer controls the operations of the remaining characters in accordance with instructions based on rules of a soccer game.

As stated above, the present invention is applicable to a soccer game as a typical example of a team play game using a ball. In this case, the game user instructs, by using a controller, one of the user characters who is in possession of the ball item, i.e., a soccer ball. Then, the motivation level is provided for the user team in accordance with the game-related predetermined situation, such as when the user team has scored a goal, or when the opposing team has scored a goal, which may be encountered while the game is in progress, or when the team is selected or when the captain is selected, which may be encountered before the game is started. The characters of the opposing team operated from another controller or controlled by the computer may also be provided with the motivation level if situations similar to those described above occur. According to the mode in which the opposing team is controlled by the computer, the motivation level unique to the computer may be separately set.

DESCRIPTION OF THE PREFERRED EMBODIMENTS

Figure 1:
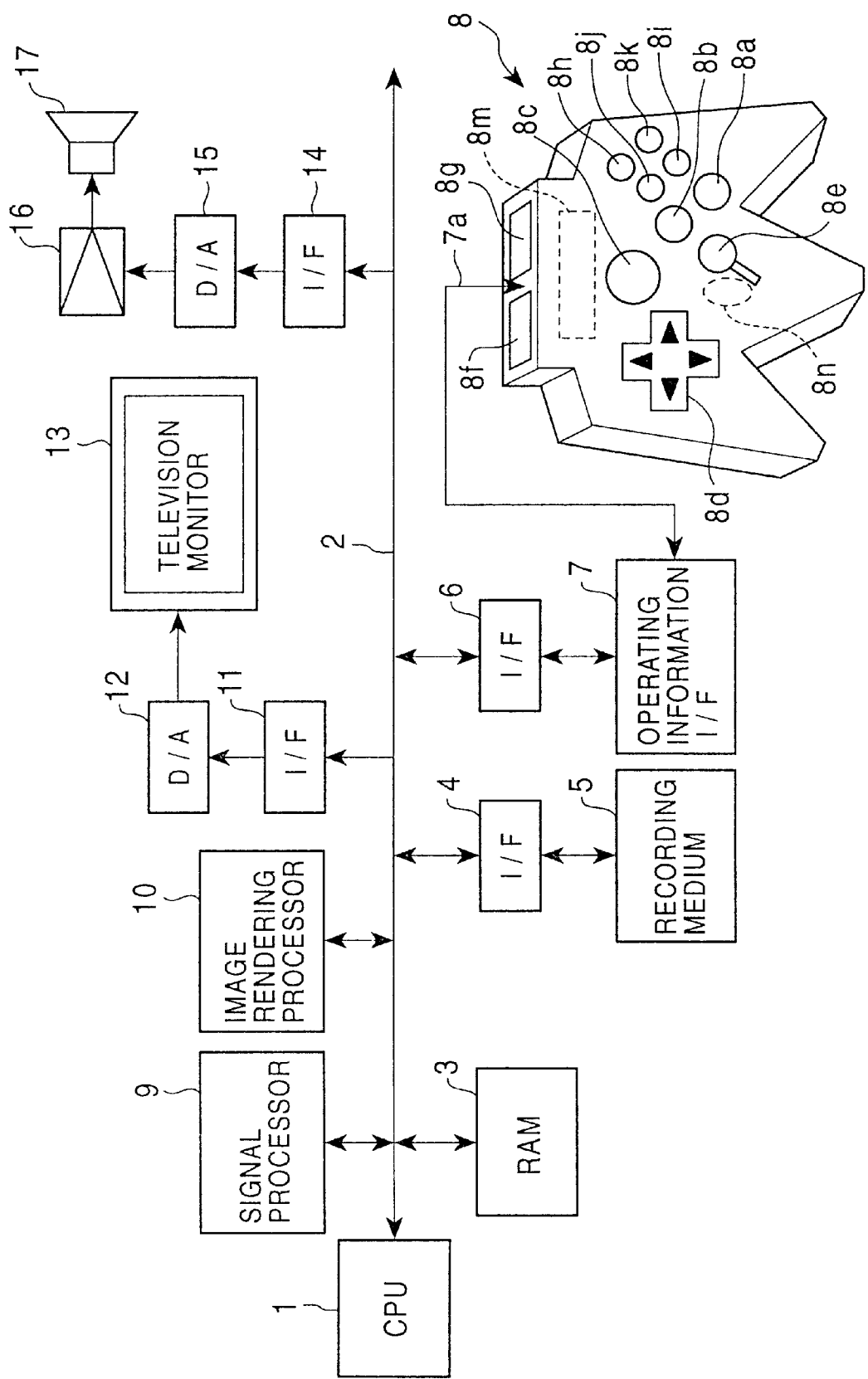
FIG. 1 is a schematic block diagram illustrating a game system according to an embodiment of the present invention.

Referring to the block diagram illustrating an embodiment of the present invention shown in FIG. 1, a game system is formed of a game machine unit, a television monitor 13 for outputting game images, a pre-main amplifier 16 and a speaker 17 for outputting game sound, and a recording medium 5 on which game data including images, sound and program data is recorded. The recording medium 5 may be an optical disk, a floppy disk, or a ROM cassette in which a ROM storing, for example, the above game data and operating system program data is accommodated within a plastic casing. A medium directly mounted on a game circuit board may also be included.

More specifically, the game machine unit is configured in the following manner. A bus 2 integrating an address bus, a data bus, and a control bus, is connected to a CPU 1. Connected to the bus 2 are a random access memory (RAM) 3, an interface circuit 4, an interface circuit 6, a signal processor 9, an image rendering processor 10, an interface circuit (buffer) 11, and an interface circuit 14. A controller 8 is connected to the interface circuit 6 via an operating-information interface circuit 7. Digital-to-analog (D/A) converters 12 and 15 are connected to the interface circuits 11 and 14, respectively.

The configuration of the game system varies according to the intended purpose of use. More specifically, if the game system is for home use, the television monitor 13, the pre-main amplifier 16, and the speaker 17 are provided separately from the game machine unit. On the other hand, if the game system is for commercial use, all the elements shown in FIG. 1 are integrated into a single housing. If the game system is primarily formed by a personal computer or a workstation, the following elements are used in place of the above-described elements of the game system. A display unit for a computer or a workstation is substituted for the television monitor 13. Part of the game program data recorded on the recording medium 5 or hardware on an expansion board mounted on a computer expansion slot is used instead of the image rendering processor 10. Hardware on an expansion board mounted on a computer expansion slot is substituted for the interface circuits 4, 6, 11, and 14, the D/A converters 12 and 15, and the operating-information interface circuit 7. An area of a computer main memory or an expansion memory is used in place of the RAM 3. In this embodiment, it is assumed that the game system is for home use.

The individual elements shown in FIG. 1 are now discussed in greater detail. The signal processor 9 primarily performs calculations for view-point positions (in this embodiment the height and the direction of a camera, a change in zoom power, etc., which will be described later) and character positions in a three-dimensional space in relation to the view-point positions, calculations for transforming three-dimensional space positions into pseudo-three-dimensional space positions, and calculations for illumination, and creates and processes sound data.

The image rendering processor 10 writes (clips) image data into the RAM 3, for example, texture data into a specific area of the RAM 3 defined by polygons, based on the calculations performed by the signal processor 9.

The controller 8 has an A button 8a, a B button 8b, a start button 8c, a cross key 8d, a stick-type controller 8e, a left trigger button 8f, a right trigger button 8g, a C1 button 8h, a C2 button 8i, a C3 button 8j, a C4 button 8k, a connector 8m, and an inward (located on the reverse side of the controller 8) button 8n. A memory device for temporarily storing, for example, the current setting of a game, is attachable to and detachable from the connector 8m. The stick-type controller 8e tilts around a predetermined position of the stick in the area covering 360 levels including the left and right directions and the forward and backward directions and has a function substantially similar to that of a joystick. The C1 button 8h, the C2 button 8i, the C3 button 8j, and the C4 button 8k are referred to as "C buttons" together. The functions of the individual buttons will be discussed when referring to the buttons.

The operation of the aforementioned game system is described below.

A power switch (not shown) is turned on to activate the game machine to cause the CPU 1 to read images, sound, and the game program data from the recording medium 5 based on the operating system stored in the recording medium 5. The read images, sound, and game program data are entirely or partially stored in the RAM 3. Thereafter, the CPU 1 proceeds with the game in accordance with the game program data and other data (image data including polygons and textures of an object to be displayed, and sound data) stored in the RAM 3, and also instructions provided by a game user via the controller 8. Namely, the CPU 1 suitably creates a command, which serves as a task for outputting graphics or sound, based on the instructions provided by the game user via the controller 8. The signal processor 9 performs calculations for view-point positions and character positions in a three-dimensional space (and in a two-dimensional space) in relation to the view-point positions, and calculations for the illumination, and creates and processes sound data, based on the above-described command.

Subsequently, the image rendering processor 10 writes image data into a display area of the RAM 3 based on the calculations performed by the signal processor 9. The image data is then supplied to the D/A converter 12 via the interface circuit 11 and is converted into an analog video signal. The video signal is further supplied to the television monitor 13 and is displayed on the screen as an image. Meanwhile, the sound data output from the signal processor 9 is supplied to the D/A converter 15 via the interface circuit 14 and is converted into an analog sound signal. The sound signal is then output from the speaker 17 as sound via the pre-main amplifier 16.

Rendering commands may be used for rendering three-dimensional images using polygons and for rendering normal two-dimensional images. In this specification, polygons are defined as polygonal two-dimensional images, and in this embodiment, triangles or quadrilaterals are used.

The rendering commands for rendering three-dimensional images by using polygons are formed of the following items of data. Polygon-vertex address data has been read from the recording medium 5 and stored in the RAM 3. Texture address data indicates the storage location in the buffer 11 of texture data to be clipped on polygons. Color palette address data represents the storage location in the RAM 3 of color palette data indicating the color of the texture data. Luminance data represents the luminance of the texture.

Among the above-described items of data, the polygon-vertex address data can be obtained in the following manner. The image rendering processor 10 performs coordinate transform, based on the amounts by which polygons are translated and rotated on the screen, on polygon-vertex coordinate data in a three-dimensional space calculated by the CPU 1, thereby transforming it into polygon-vertex coordinate data in a two-dimensional space. The image rendering processor 10 writes texture data corresponding to the zone of the display area of the RAM 3 represented by the three-or-four-sided polygon address data.

A single object is formed of a plurality of polygons. The CPU 1 stores three-dimensional coordinate data of each polygon in the RAM 3. When players, i.e., game characters, are moved on the screen by operating the controller 8 by the user, in other words, when the player's movements are expressed or when the position from which the players are viewed (the view-point position) is changed, the following processing is executed.

The CPU 1 sequentially determines three-dimensional coordinate data of the individual polygons after being translated and rotated, based on the three-dimensional polygon-vertex coordinate data stored in the RAM 3 and the amounts by which the polygons have been translated and rotated. Among the three-dimensional polygon coordinate data obtained as described above, horizontal and vertical coordinate data is supplied to the image rendering processor 10 as the address data on the display area of the RAM 3, i.e., polygon-vertex address data. The image rendering processor 10 then writes texture data represented by predetermined texture address data into a triangle or quadrilateral display area of the buffer 11 represented by the three-or-four-sided polygon vertex address data. This makes it possible to display on the screen of the monitor 13 objects (user's players and opposing players, referees, a field, a goal net, stands, spectators, etc.) obtained by clipping the texture data on a plurality of polygons.

The normal two-dimensional rendering commands are formed of vertex address data, texture address data, color palette address data, which represents the storage location in the RAM 3, of color palette data indicating the color of the texture data, and luminance data indicating the luminance of the texture data. Among the above-mentioned items of data, the vertex address data is coordinate data obtained by performing coordinate transform by the image rendering processor 10 on the two-dimensional vertex coordinate data calculated by the CPU 1, based on the amounts by which the polygons have been translated and rotated. The rendering operation is hereinafter simply referred to as "issuing a rendering command".

The signal processor 9 stores adaptive differential pulse code modulation (ADPCM) data read from the recording medium 5 in the RAM 3, and the ADPCM data is used as a sound source. The signal processor 9 then reads the ADPCM data from the RAM 3 at a clock frequency of, for example, 44.1 KHz. The signal processor 9 then performs processing, such as pitch conversion, noise addition, envelope setting, level setting, reverb addition, etc., on the ADPCM data. If the sound data read from the recording medium 5 is pulse code modulation (PCM) data compliant with, for example, the compact disk-digital audio (CD-DA) format, it is converted into ADPCM data by the signal processor 9. The processing to be executed on the PCM data by using program data is directly performed in the RAM 3. The PCM data is then supplied to the signal processor 9 and is converted into ADPCM data. Subsequently, the above-described various operations are conducted on the ADPCM data, which is then output from the speaker 17 as sound.

The data stored within the recording medium 5 is read by a driver, such as a hard disk drive, an optical disc drive, a floppy disk drive, a silicon disk drive, or a cassette-type medium reader. As the recording medium 5, a hard disk, an optical disc, a floppy disk, or a semiconductor memory may be employed. The driver reads images, sound, and program data from the recording medium 5 and supplies the read data to the interface circuit 4. The interface circuit 4 then executes error correction processing by using error correction code (ECC) on the reproduced data output from the driver, and supplies the error-corrected data to the RAM 3 or to the signal processor 9.

A soccer game employed by the present invention is described below with reference to FIGS. 1, 2 through 10.

Figure 2:
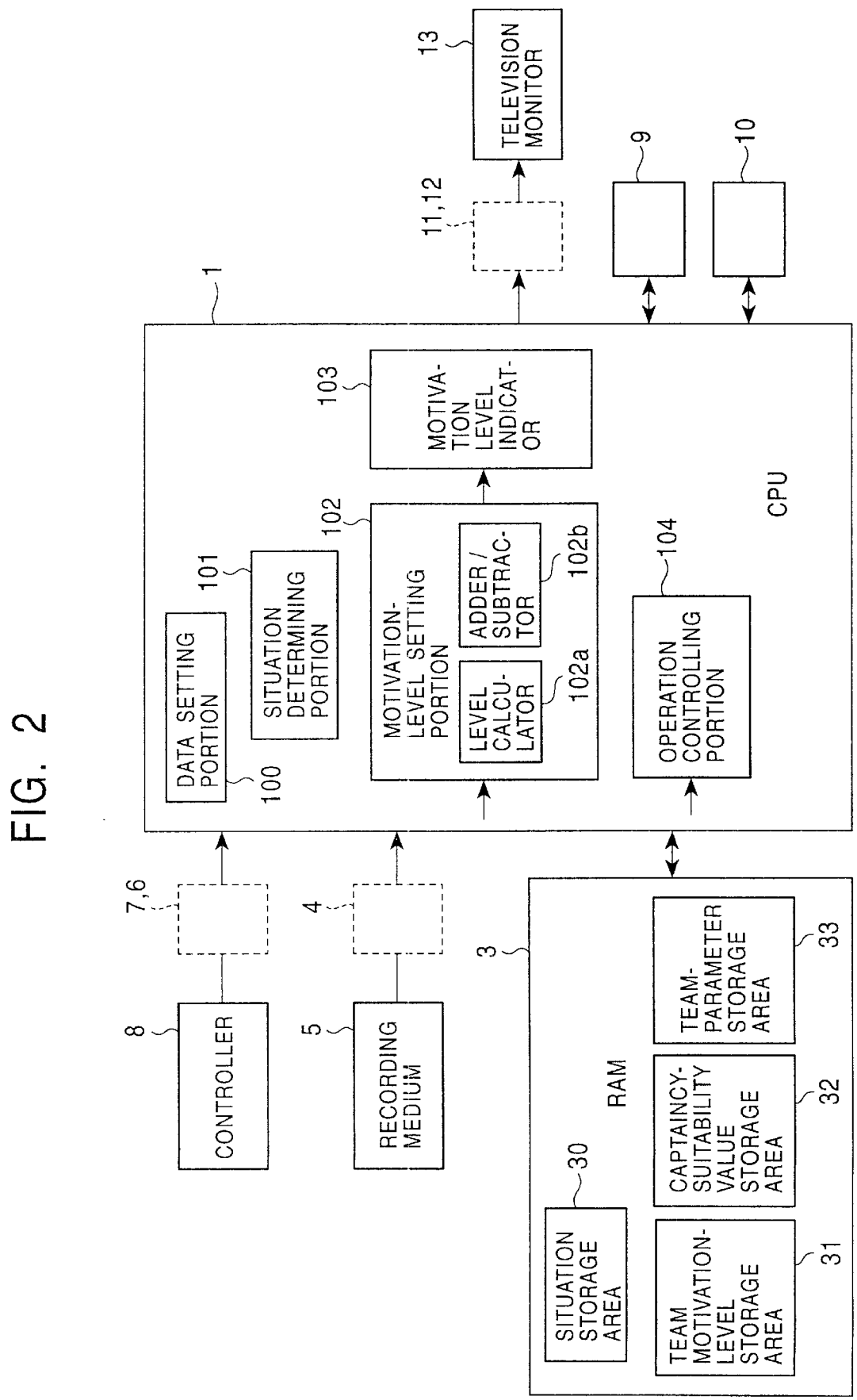
FIG. 2 is a block diagram primarily illustrating the function of the CPU shown in FIG. 1.
Figure 3:
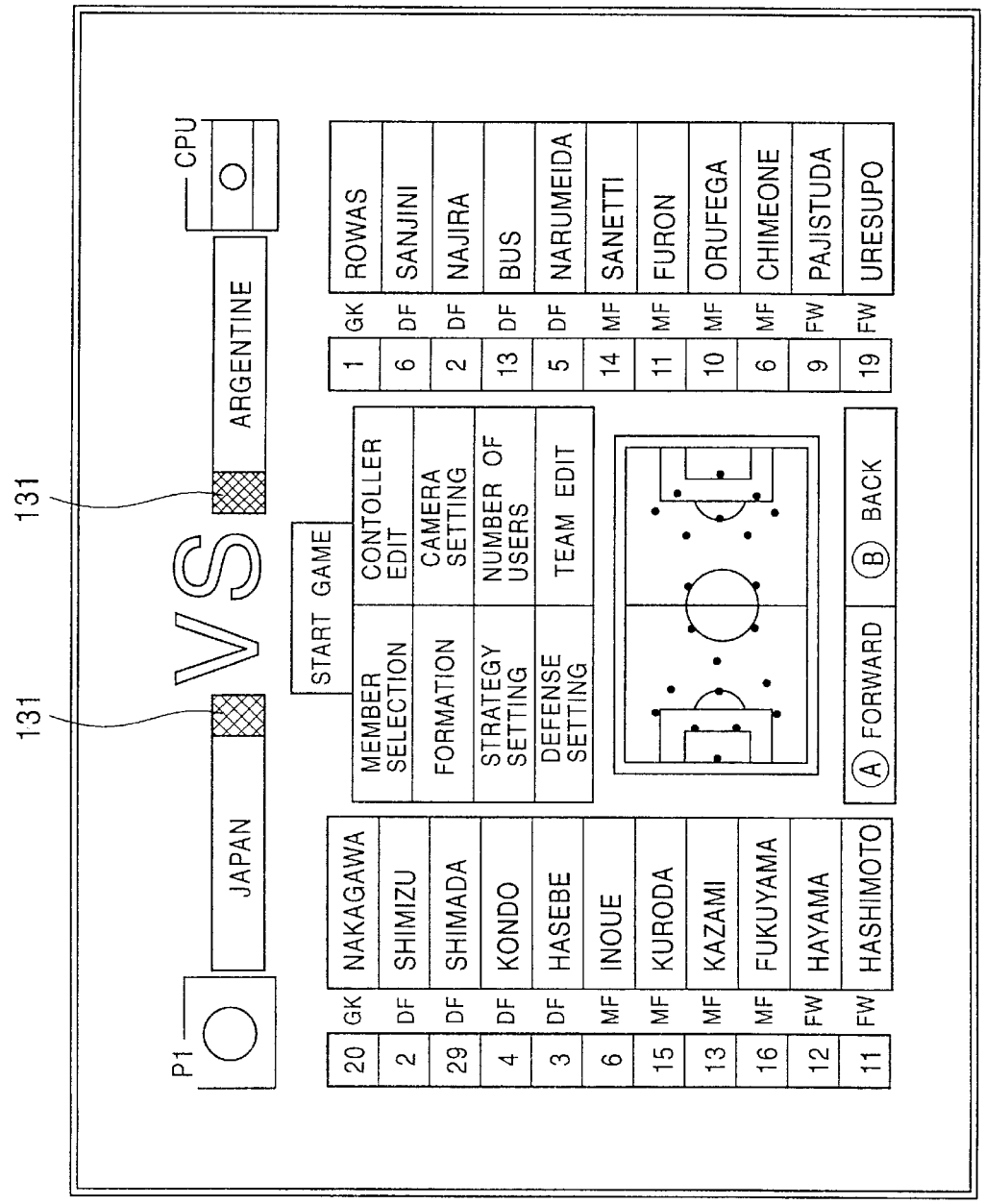
FIG. 3 illustrates the team selection screen displayed before the start of a game.
Figure 4A:
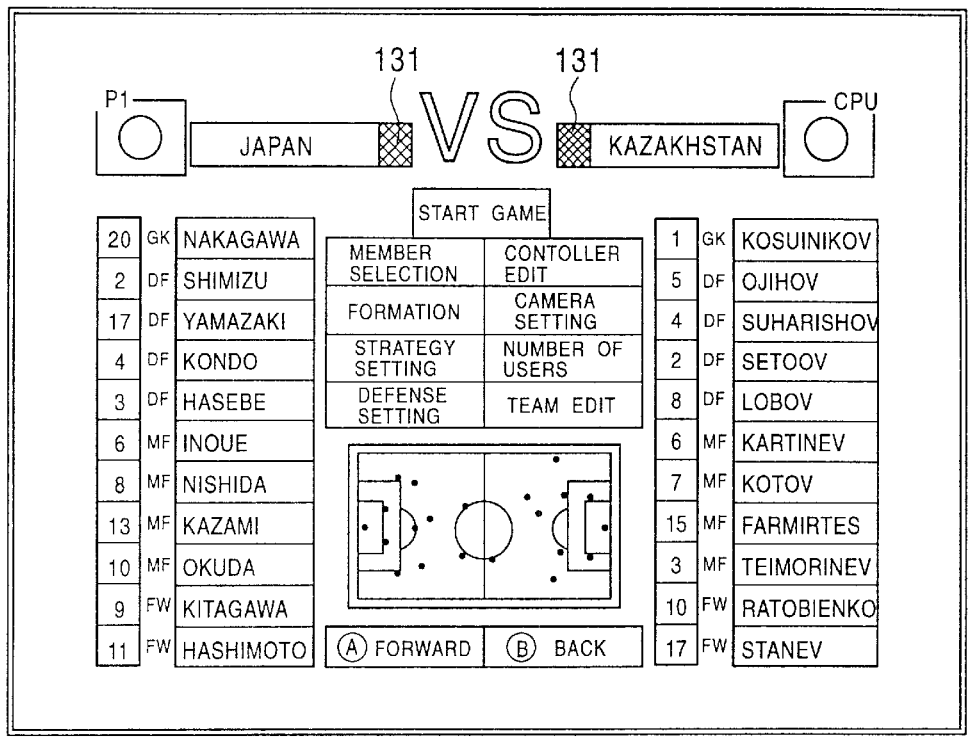
FIGS. 4A and 4B illustrate the team selection screens displayed before the start of a game.
Figure 4B:
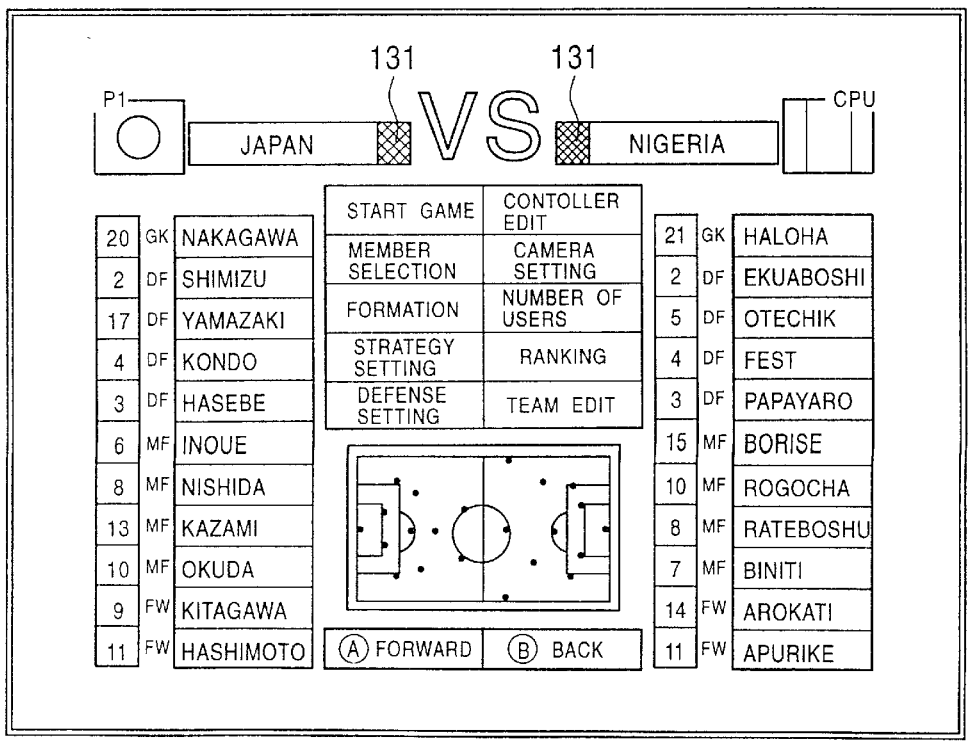
Figure 5A:
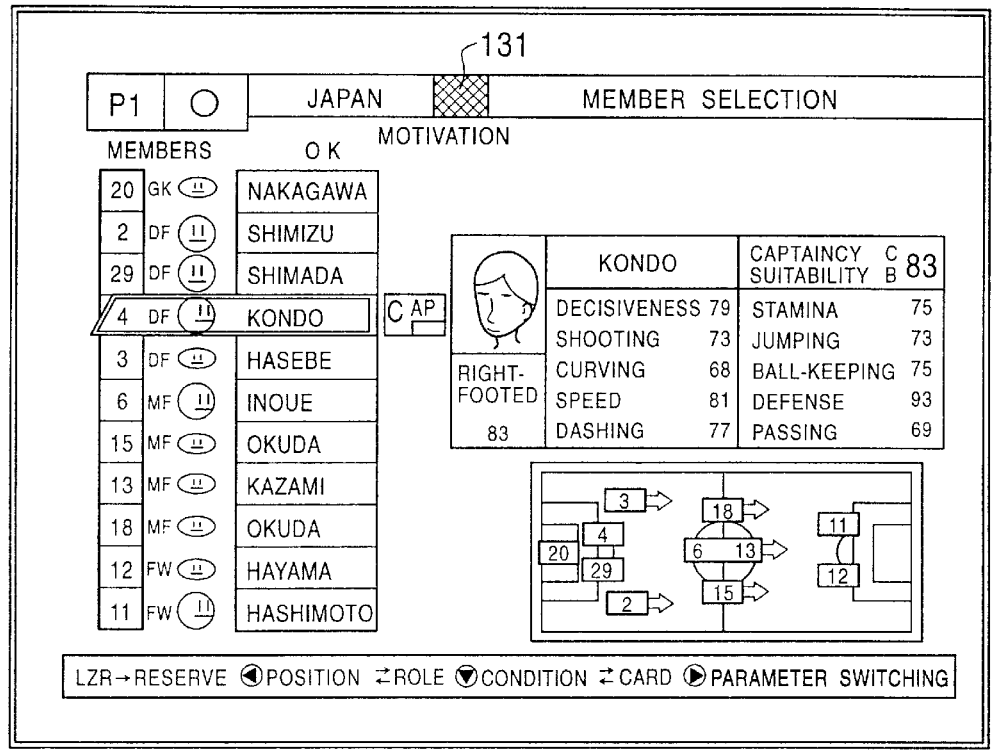
FIG. 5A illustrates the member selection screen before the captain is changed.
Figure 5B:
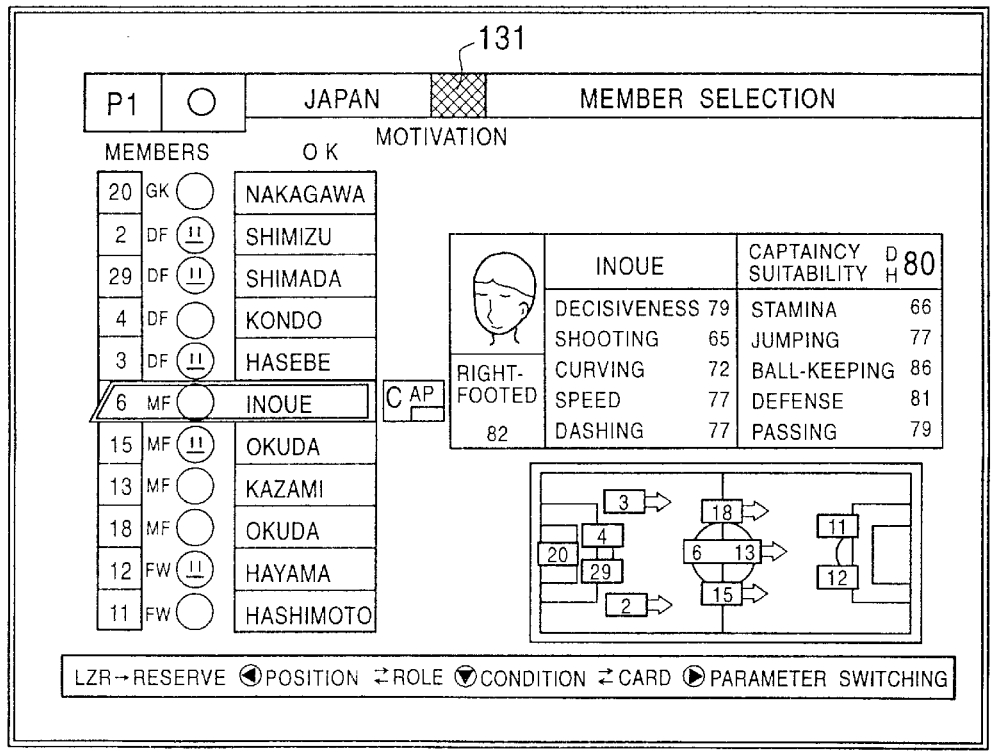
FIG. 5B illustrates the member selection screen after the captain is changed.
Figure 6:
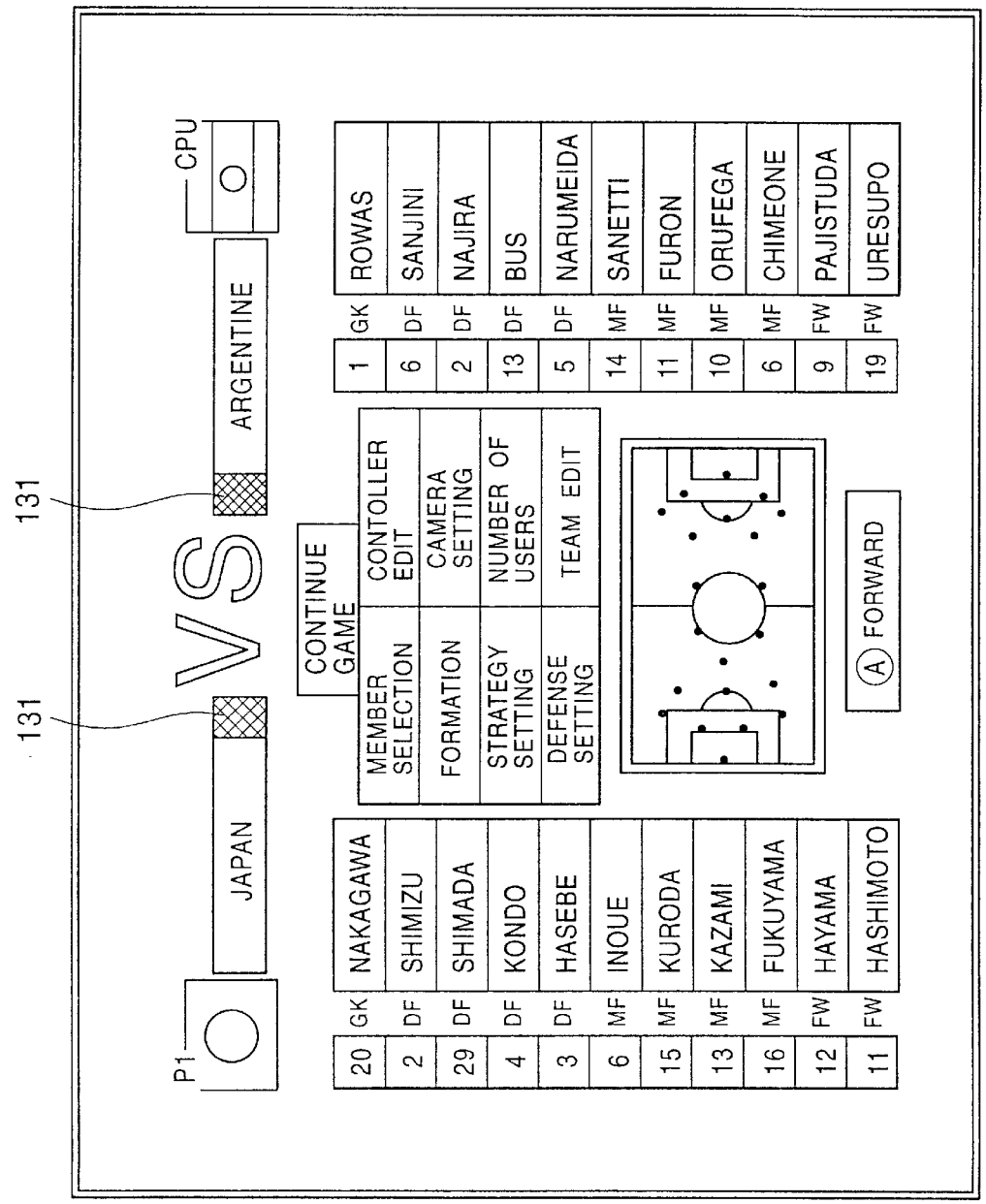
FIG. 6 illustrates the edit select screen displayed when a goal is scored.
Figure 7:
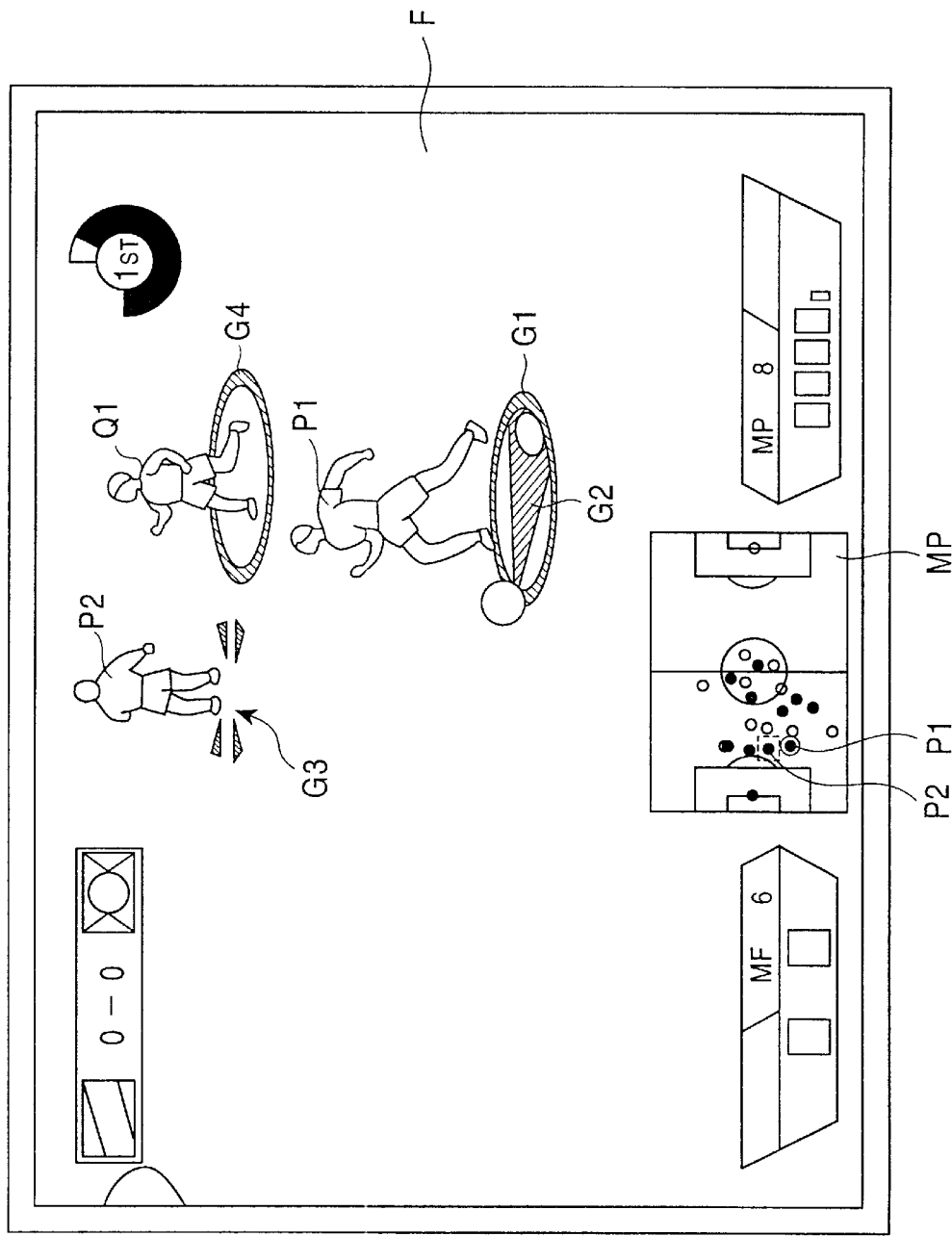
FIG. 7 illustrates the monitor screen illustrating one scene of a soccer game.
Figure 8:
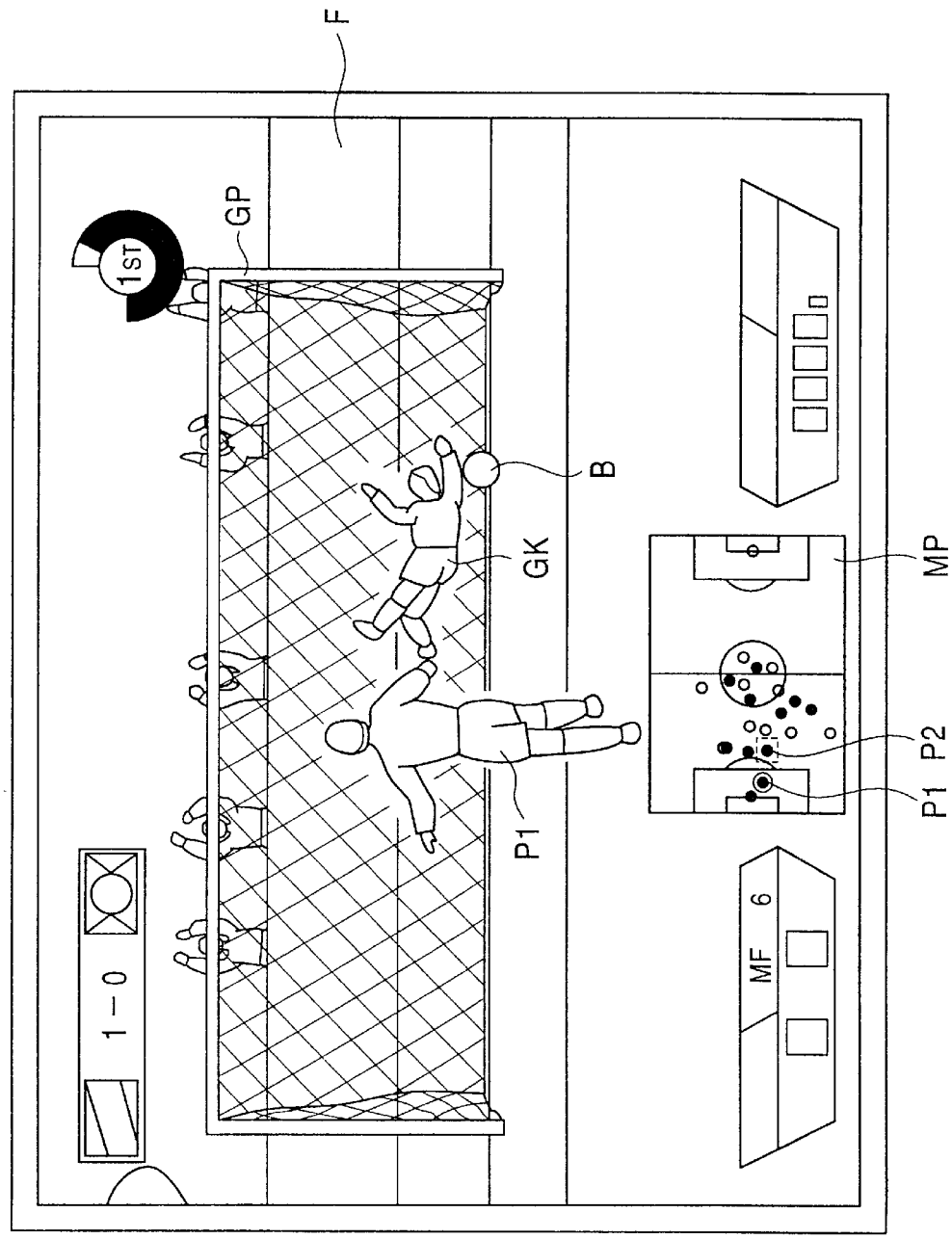
FIG. 8 illustrates the monitor screen displayed when a soccer player has shot a ball and scored a goal.

FIG. 2 is a block diagram primarily illustrating the function of the CPU 1 shown in FIG. 1. FIGS. 3, 4A, and 4B illustrate a team selection screen displayed before the start of a game. FIG. 5 illustrates the member selection screen displayed before a game is started; more specifically, FIG. 5A illustrates the selection screen displayed before the captain is changed, and FIG. 5B illustrates the selection screen displayed after the captain has been changed. FIG. 6 illustrates the edit selection screen displayed when a goal is scored. FIG. 7 illustrates one scene of the soccer game. FIG. 8 illustrates that a soccer player has shot a ball and scored a goal.

In the soccer video game used by the present invention, prior to the start of the game, various screens for registering game modes and conditions are displayed by utilizing the registering-screen display function provided for the CPU 1. The screen for setting the game modes is first displayed in the shape of icons. The game modes include, for example, "League competitions", "Tournaments", "World league competitions, first stage to third stage", "World cup preliminary rounds", "World cup final rounds", "World cup tournaments", etc. A game user designates a desired icon by moving a cursor with the cross key 8d, and when pressing the A button 8a, the screen of the designated game mode appears. If, for example, "Tournaments" is specified, the "game setting" screen is subsequently displayed to instruct the user to set, for example, the opposing team. The user is then allowed to set the roles of the soccer players, such as forward (FW), midfielder (MF), and defender (DF).

Subsequently, the setting of the positions is instructed. A screen similar to that shown in FIG. 5A, which will be discussed later, appears by utilizing the registering-screen display function of the CPU 1. The players and their positions are vertically listed. One of the players is designated with the cross key 8d, and by pressing the A button 8a at this position, detailed characteristics of the designated (selected) player, i.e., individual capabilities, such as decisiveness, shooting, ability of curving a shot ball, speed, dashing, stamina, jumping, ball-keeping, defense, and passing, are displayed. When determining these characteristics, priority is given to some capabilities according to the positions of the individual players. The above-described settings can be made in the following manner. One of the capabilities is selected with the cross key 8d, and by pressing the A button 8a, the data setting function (data setting portion 100 shown in FIG. 2) of the CPU 1 registers the corresponding data for each player and also changes the display content of the screen. The capabilities can be easily identified by the numbers (1 through 99). It is also possible to identify from the display frame of the player list which player is currently selected, and the player's face and the game capability including his characteristics are displayed at a portion on the right side of the screen.

At the lower right portion of the screen, the field is displayed together with the positions of the designated players, the positions being indicated by the corresponding numbers and adjustable within the respective areas by using the cross key 8d. The "area" described above indicates a portion-which is located around the territory basically set for each position and which does not interfere with adjacent positions. After completing the selection of the players, the A button 8a is pressed to determine the selected players.

In FIG. 2, the CPU 1 has individual functions, such as a data setting portion 100, a situation determining portion 101, a motivation-level setting portion 102, a motivation-level indicator 103, and an operation controlling portion 104. In addition to the above-described functions, other functions, such as a clock for managing game times (soccer game times) and schedules of, for example, league competitions, calendars, etc., are provided for the CPU 1. The RAM 3 has memory areas for storing the game program and other data read from the recording medium 5, as discussed above. As part of such memory areas, a situation storage area 30, a team motivation-level storage area 31, a captaincy-suitability value storage area 32, and a team-parameter storage area 33 are provided.

Predetermined important situations, which may be encountered prior to the start of the game or while the game is in progress, have been stored in the situation storage area 30. The situation determining portion 101 then determines whether various situations encountered in response to instructions by operating the controller 8 by the user, or situations encountered while the game is in progress, coincide with the predetermined situations stored in the situation storage area 30. In other words, the situation determining portion 101 determines whether the registered situations have occurred while the game is in progress.

The above-mentioned predetermined situations registered in the situation storage area 30 may include the following items. Concerning the situations which may be encountered before the start of the game, game mode, selecting the user team and the opposing team, selecting the captain, and so on may be registered. Regarding the situations encountered after the start of the game, scoring a goal (either by the user team or the opposing team), halftime, substituting players, ejecting players, etc., may be registered.

The team motivation-level storage area 31 stores the motivation level unique to each of the teams registered in the recording medium 5 in comparison with the other teams. The team motivation-level storage area 31 reads the motivation level of the user team, selected by operating the controller 8, and provides the read motivation level to the selected team. Likewise, when the user selects the opposing team, the team motivation-level storage area 31 also provides the corresponding motivation level to the selected opposing team. The motivation level is determined not only by the factors of the selected team, but also by the game mode (i.-e., whether the game is a home game or an away game). For example, a level higher than a normal level is set for world league competitions, and within the world league competitions, an even higher level is set for the third stage than the first stage.

The relationship of the user team to the selected opposing team is also considered. Extra values ranging from, for example, 0 to 10 are added or subtracted according to a level gap between the user team and the opposing team, while considering, for example, the level gap of the attacking or defense ability. For calculating the level gap, the values representing the individual player's capabilities (characteristics), shown in FIG. 5, of each team, classifying the capabilities into two categories, such as attacking and defending, are added, so that the virtual attacking ability and the virtual defense ability of each team can be obtained. Then, the difference in the values between the two teams may be used.

The captaincy-suitability value storage area 32 stores the values, which represent the suitability of being team captain, for all the players registered in each team. Such values have been set by considering factors, such as quality, ability, etc., which are necessary to be a team captain. When the captain is designated, the corresponding captaincy-suitability value is read out to the CPU 1. The captaincy-suitability value is to be added to the motivation level set for the team, and is also reflected in the motivation level of the team in response to predetermined situations, in particular, when a goal is scored by the user team or the opposing team. This will be described later in greater detail.

The team-parameter storage area 33 stores parameters for characterizing each team in relation to the other teams. For example, when a goal is scored by the opposing team, the motivation level is seriously decreased (easily discouraged), or conversely, the motivation level is increased (persistent). When a goal is scored by the user team, the motivation level is significantly increased (easily encouraged). Parameters are represented by, for example, 0 through 3, corresponding to each of the above characteristics, and the parameters may be wholly or partially employed for characterizing the individual teams. For example, for the Japan team, parameters, such as [easily discouraged; persistent; easily encouraged]=[0, 3, 1] are set. In this case, the Japan team is very persistent and may be somewhat easily encouraged. An approach to using the captaincy-suitability value and the team parameters will be discussed later.

The motivation-level setting portion 102 forms motivation-level setting means by being appropriately combined with the team motivation-level storage area 31, the captaincy-suitability value storage area 32, and the team-parameter storage area 33. The motivation-level setting portion 102 includes therein a level calculator 102a and an adder/subtractor 102b for adding/subtracting a newly calculated motivation level to/from the previous motivation level. The motivation level calculated in the level calculator 102a may be a positive or negative value according to the situation. The added or subtracted value ranges, for example, from 0 to 255, and if the calculated value deviates from this range, it is forced to be set to one of the boundary values of the range. Instead of adding or subtracting a newly calculated motivation level to or from the previous motivation level, the motivation-level setting portion 102 may precisely calculate only the current motivation level generated in response to a situation without considering the previous motivation level. The motivation-level setting portion 102 also takes counts of the motivation level based on the captaincy-suitability value toward the motivation level read from the team motivation-level storage area 31.

The motivation level may be calculated from the captaincy-suitability values of the captain and of the other members, and the value obtained by the relationship of the user team to the game mode or to the opposing team may be further added to or subtracted from the above-calculated motivation level. In this case, for example, the value obtained by multiplying the captaincy-suitability value of the designated captain by a coefficient k, for example, 2, may be added to the value obtained by multiplying the captaincy-suitability values of the remaining members by a coefficient smaller than the coefficient k, for example, by 0.5 (or 1). The resulting value may be used as the motivation level. With this arrangement, the player having a high captaincy-suitability value can be specified as the captain, thereby significantly enhancing the motivation level for the team.

The motivation-level indicator 103 indicates in color the motivation level calculated in the motivation-level setting portion 102 in a square portion 131, which is placed adjacent to the team name (in this example, Japan) next to the national flag (in this example, Hinomaru (Japanese national flag)) located on the upper left of the edit selection screen shown in FIG. 3. The number of colors is 256, and the colors from red to blue (the wavelength direction) are set corresponding to the range of the motivation level from the lower level to the higher level. It is not necessary to assign the 256 individual types of colors to the 256 individual motivation levels. If it is sufficient that a certain level of motivation is identifiable, a suitable number of colors, such as 12 colors or 24 colors, suffices.

The operation controlling portion 104 controls characters to move in accordance with the instruction given. The video game machine of the present invention may be adapted for 1P play and 2P play. In 1P play, a single controller 8 is provided, and an opposing team (which is selected by the computer or the game user) competes against the player which is under the control of the computer. In 2P play, two controllers 8 are provided, and two game users select the respective teams and compete against each other.

During 1P play, the controller 8 provides the following instructions for different situations. When the team controlled by the computer is on the attacking side, the controller 8 provides instructions for various attacking operations to the player of the user team possessing the soccer ball. In contrast, when the opposing team is on the attacking side, the controller 8 provides instructions for various defense operations to the player of the user team located closest to the player possessing the ball. Concerning the remaining players, the computer executes computation to manage and control the positions of the individual players based on the game program as close as possible to actual soccer rules. Thus, the game can smoothly progress without presenting an unnatural atmosphere to the overall movement of the game. During 2P play, on the other hand, the controller 8 controls only the movements of the player possessing the ball and the player of the opposing team located closest to the player who possesses the ball. The operations of the remaining players are controlled based on soccer rules, as in 1P play.

A brief explanation is given below of the details of the game screens displayed on the television monitor 13. Referring to the edit selection screen displayed before the start of the game, as shown in FIG. 3, the individual players of opposing teams, i.e., Japan and Argentine, are listed, and the colors corresponding to the respective motivation levels are indicated on the indicating portions 131.

FIGS. 4A and 4B illustrate examples of game modes; FIG. 4A illustrates the screen displayed when the Japan team competes against the Kazakhstan team in the first stage of the world league; and FIG. 4B illustrates the screen displayed when the Japan team competes against the Nigeria team in the third stage of the world league. The color indicated in the indicating portions 131 of the Japan team is different between the screens shown in FIGS. 4A and 4B. The color of the indicating portion 131 of the game screen for the third stage (FIG. 4B) is bluer (due to the greater value added to the motivation level according to the game mode), and indicates that the Japan team is highly motivated.

FIGS. 5A and 5B illustrate the member selection screen. FIG. 5A illustrates the screen displayed before the captain is changed (or the screen displayed when selecting the captain before the start of the game), "Kondo" being designated as the captain, as indicated by characters "Cap" next to "Kondo". FIG. 5B illustrates the screen after the captain has been changed from "Kondo" to "Inoue" (or the screen when "Inoue" is specified as the captain). The colors indicated in the indicating portions 131 are different between the screens illustrated in FIGS. 5A and 5B. A change of the captain may be made before the start of the game or while the game is in progress.

If the captain is changed while the game is in progress, the motivation level may be set in the following manner in response to a change of the captain. In relation to the motivation level (which is determined to be A) when "Kondo" has been selected as the captain, the motivation level (which is determined to be B) when the captain has been changed to "Inoue" from "Kondo" is calculated according to the aforementioned method, and the value C is provided as a random item. Then, the equation expressed by $D=A-B+C$ is calculated. The resulting value D is reflected in the motivation level in the following manner. When the value D is 0 or greater, it is added to the motivation level before substituting the members. If the value D is −20 or smaller, the value D+20 is added to the motivation level before substituting the members. When the value D is greater than −20 and smaller than 0, i.e., $-20<D<0$, the motivation level before substituting the members remains the same. FIG. 6 illustrates the edit selection screen displayed when a goal is scored (either by the Japan team or the Argentine team). In this case, the motivation level is changed, and the colors of the indicating portions 131 are also changed accordingly.

FIG. 7 illustrates one scene of the soccer game. The teams are shown on the upper left portion of the screen, and the score is also shown. The time left for the game is indicted on the upper right portion of the screen. On the lower left portion, the name of the player (in this example, MF6) who is currently operated by the game user is shown. On the lower right portion, the name of the opposing player (in this example, MP8) positioned closest to the above-mentioned player MF6 is indicated.

On the game screen, the field F is displayed, and the player P1 possessing the ball and operated by the user, the opposing player Q1 positioned closest to the player P1, and the player P2 who is on the same team as the player P1 and is located closest to the player P1 are indicated substantially at the center of the screen. In this case, the player operated by the user is basically the player P1 who is in possession of the ball. In order to easily identify the player P1 and its direction, the CPU 1 has the following functions: a monitoring function of monitoring and identifying the player P1 who is in possession of the ball; a first guide indicating function of indicating a ring-like guide G1 located on the field near the feet of the player P1; and a direction-guide indicating function of indicating a guide G2, in a color different from that of the guide G1, which represents the direction in which the player P1 advances or the direction in which the ball moves, as indicated by the arrow. According to a second guide indicating function provided for the CPU 1, a guide G3, which is radially extending in the four directions around the feet of the player P2, who is most likely to receive the ball passing from the player P1, is indicated in the same color as the guide G1. The second guide indicating function still works even when the player P2 is off the screen to make the guide G3 invisible. That is, part of the guide G3 is indicated at an edge of the screen in the direction in which the player P2 is moved, thereby appropriately guiding the user to the direction in which the player P1 should pass the ball. According to a third guide indicating function of the CPU 1, a ring-like guide G4 is provided in a color different from that of the guide G1 near the feet of the opposing player Q1 positioned closest to the player P1, thereby attracting the user's attention to make the user careful.

Instructions provided for the movements of the player P1 are now briefly explained. The player P1 is moved based on instructions given by operating the individual buttons of the controller 8, so that the user is able to set desired operating patterns. As an example of such patterns, when the user is on the attacking side, an instruction is given by operating the stick-type controller 8e in the direction in which the player P1 dribbles the ball. Other movements can be conducted by a combination of the stick-type controller 8e and the following buttons; to pass the ball, the A button 8a, to shoot the ball, the B button 8b, to through-pass the ball, the C1 button 8h, to dash with the C2 button 8i, to lob the ball, the C3 button 8j, to perform one-two-pass, the C4 button 8k. Conversely, when the user is on the defending side, instructions are provided for the movements of the player Q1 to obtain desired operating patterns by utilizing buttons similar to those described above.

FIG. 8 illustrates a game screen displayed when the ball has been shot to score a goal. More specifically, the soccer ball B possessed by the player P1 has been shot by operating the B button 8b and gone through a goalkeeper GK, thereby-scoring a goal. As a result, the score, which has been indicated as "0–0", as shown in FIG. 7, is changed into "1–0", as shown on the upper left portion of the screen.

Figure 9:
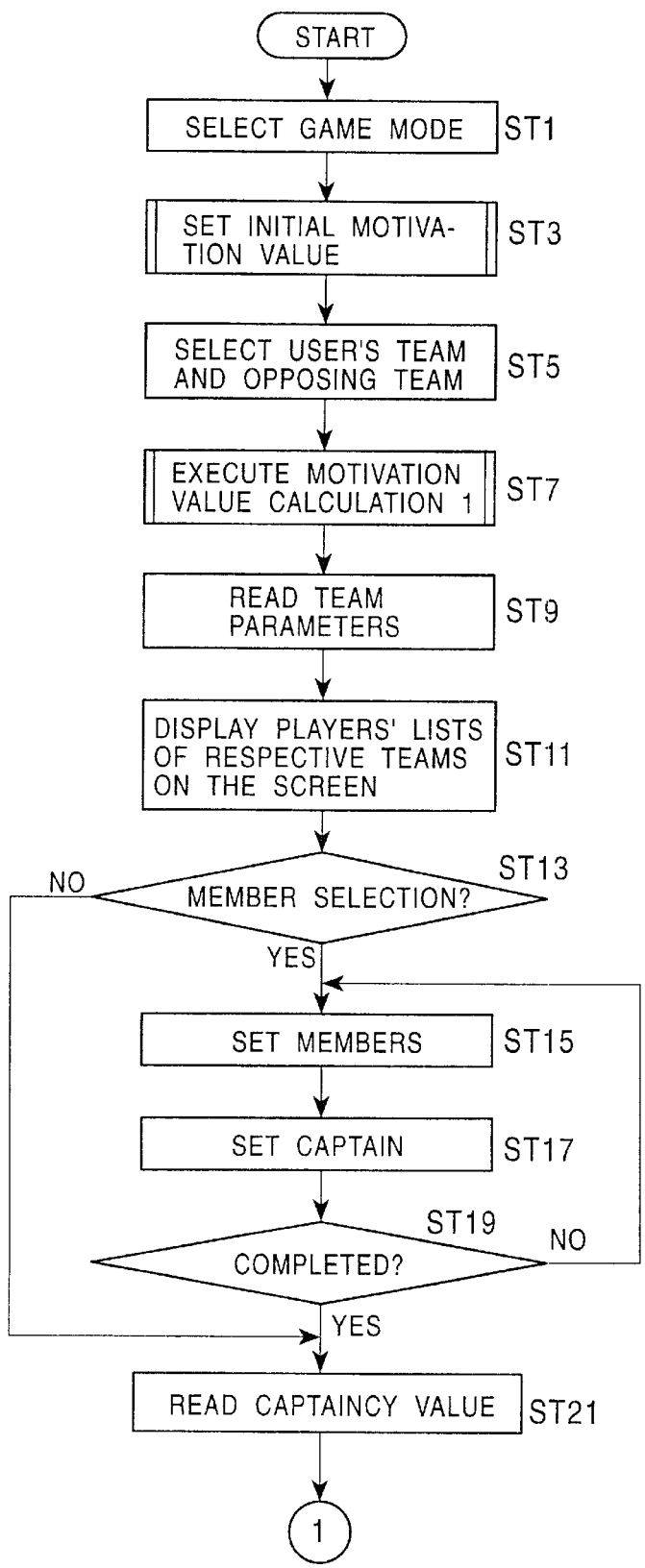
FIGS. 9 and 10 are a flow chart illustrating one example of the game process controlled by the CPU.
Figure 10:
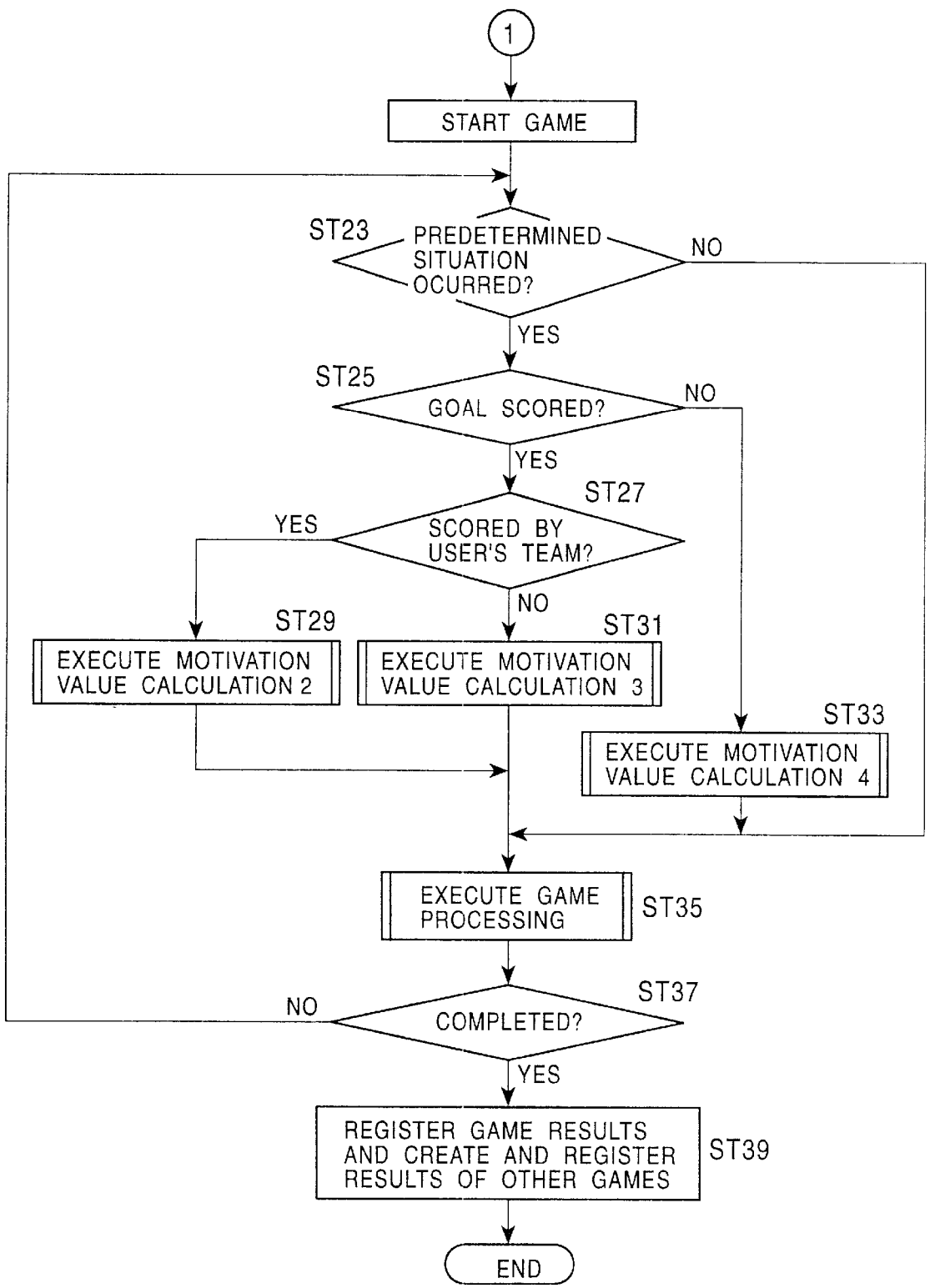

A description is now given of one example of the game process controlled by the CPU 1 with reference to the flow chart shown in FIGS. 9 and 10. In the flow chart, the motivation value represents the motivation level, while the captaincy value designates the captaincy-suitability value.

The recording medium 5 is first loaded in the game system and main power (not shown) is turned on to display the start screen, in a manner similar to an ordinary game. The team selection menu is now ready to be specified. The game mode is first selected in step ST1. If the "World league competitions" mode is selected, the screen, such as that shown in FIG. 4A or 4B, is displayed based on the game controlled by the computer, i.e.,. based on the matching of the teams of the league competitions. The teams to participate in the world league competitions, and matching of the teams of the individual league stages and schedules have been registered in the recording medium 5. After the opposing teams for the game have been determined, the value set for each team in response to the opposing team and the value set for the selected league stage are taken account of in the predetermined motivation level unique to the corresponding team. As a result, the initial motivation level is determined and indicated on the indicating portion 131 in step ST3.

If a normal game mode, such as the "Tournaments" mode, is selected in step ST1, the processing (for the world league competitions) of step ST3 is skipped, and the team selection menu is specified. Then, the names of a plurality of teams (not shown) are indicated on the screen so as to instruct the user to select the user team and the opposing team (step ST5). Upon completion of selecting the teams, the screen, such as that shown in FIG. 3, appears to instruct the user to select or designate the players and the captain on the user side.

Subsequently, the "motivation value calculation 1" is executed in step ST7. That is, the level gap of each team to the opposing team ranging from 0 to 10 is added to or subtracted from the motivation level inherent in each team, thereby determining the motivation level. Thereafter, "team parameters", which will be reflected in the motivation level when a goal is scored, are read in step ST9. Thereafter, the player lists of the respective teams are displayed in step ST11.

When the member selection menu is activated by the user in step ST13, the screen, such as that shown in FIG. 5A or 5B, appears to enable the user to select, by using the controller 8, eleven players from among at least eleven members belonging to each team while relating the members to the players' positions in step ST15. In step ST17, the captain is designated, as shown in FIG. 5A or 5B. After completion of selecting the members and the captain (if the outcome of step ST19 is yes), the captaincy values (captaincy-suitability values) of all the eleven players are read in step ST21.

After the above-described settings, the game is started. It is then determined in step ST23 whether one of the above-described predetermined situations has occurred. If the result of step ST23 is no, the process proceeds to step ST35 in which the normal game processing is executed. If it is found in step S23 that one of the predetermined situations has occurred, it is checked in step ST25 whether a goal has been scored. If the outcome of step S25 is yes, the process proceeds to step ST27. If the result of step ST25 is no, the process proceeds to step ST33.

In step ST27, it is determined whether the goal has been achieved by the user team. If the outcome of step ST27 is yes, the "motivation value calculation 2" is executed in step ST29. If it is found in step ST27 that the goal has been achieved by the opposing team, the "motivation value calculation 3" is executed in step ST31. If it is found in step ST25 that a situation other than scoring a goal has been encountered, the "motivation value calculation 4" is performed in step ST33. The "motivation value calculation 2" through "motivation value calculation 4" will be described in detail later.

Upon completion of the respective motivation value calculations, the process proceeds to step ST35 in which game processing is executed to control the players' various operations with the altered motivation levels. It is further determined in step ST37 whether the first half or the second half of the soccer game has been completed. If the game has not been completed, the process returns to step ST23, and the processing similar to that described above is repeated. If the game has been completed, the process proceeds to step S39 in which the game results, i.e., the scores of the respective teams, are registered in the recording medium 5, and the results of the other games are also created and registered. In this case, if the game mode is the "League competitions" or the "World league competitions", it is assumed that games take place in other places, so that the CPU 1 creates the results of the other games, i.e., which teams have won and which teams have lost, according to a predetermined game-result creating program. The game results are reflected in the motivation levels of the user team and of the opposing team when the user team is to compete against another team in another game, thereby making the game more interesting.

The "motivation value calculations 2 and 3" are conducted by determining by the CPU 1 what type of result scoring has caused. The types of results include: the team (1) has tied the opposing team; (2) goes ahead of the opposing team after the scores were even; (3) goes ahead of the opposing team after the team was once behind; (4) has scored the first point; (5) has added another point (two points ahead); (6) has added another point (three points ahead); (7) has added another point (four points or more ahead); (8) gets close to the opposing team (one point behind); and (9) gets close to the opposing team (two points behind). The CPU 1 further determines whether the goal has been scored in the first half or the second half. Additionally, extra factors, such as the first half and the second half of extra time and own goal, may be taken account of in the calculation for the motivation level, thereby enhancing the entertaining characteristics of the game.

Details of the "motivation value calculation 2" are as follows. It should be noted that the scores indicated in the parentheses are expressed from the point of the view of the user team.

1. First half (1) When the user team has scored a goal and tied the opposing team, the value, for example, 20, (hereinafter referred to as the "value i") is added as the reference value. In a close game in which the difference in points of the user team and the opposing team is, for example, four or less, with very little time left toward the end of the first half, a value nearly doubling the value i may be added to enhance the motivation of the team.

(2) When the user team has scored a goal and goes ahead of the opposing team after the scores were even, a value smaller than the value i is added.

(3) When the user team has scored a goal and goes ahead of the opposing team after the team was once behind, a value somewhat greater than the value i is added. In a close game with very little time left, a value nearly doubling the value i is added to enhance the motivation of the team.

(4) When the user team has scored the first point, the value i is added, as in the same value set in (1).

(5) When the user team has scored another goal (two points ahead), only a value somewhat smaller than the value i is added.

(6) When the user team has scored another goal (three points ahead), a value on the order of the value i or a randomly set value (somewhat smaller than the value i) is subtracted to decrease the motivation of the team, thereby making the team less alert.

(7) When the user team has scored another goal (four points or more ahead), a value greater than the value i is subtracted.

(8) When the user team has scored a goal and gets close to the opposing team (only one point behind), a value somewhat greater than the value i is added to enhance the motivation of the team.

(9) When the user team has scored a goal and gets close to the opposing team (two points behind), a value greater than the value i and smaller than the value set in (8) is added.

2. Second half (1) When the user team has scored a goal and tied the opposing team, a value smaller than the value i is added. If there is very little time left toward the end of the game, a value on the order of the value i is added, thereby enhancing the motivation of the team.

(2) When the user team has scored a goal and goes ahead of the opposing team after the scores were even, a value smaller than the value i is added. If there is very little time left toward the end of the game, a value on the order of the value i is added, thereby enhancing the motivation of the team.

(3) When the user team has scored a goal and goes ahead of the opposing team after the team was once behind, a value somewhat greater than the value i is added. In a close game with very little time left, a value nearly doubling the value i is added to further enhance the motivation of the team.

(4) When the user team has scored the first point, a value somewhat smaller than the value i is added.

(5) When the user team has scored another goal (two points ahead), only a value somewhat smaller than the value i is added.

(6) When the user team has scored another goal (three points ahead), a value somewhat greater than the value i or a randomly set value (somewhat smaller than the value i) is subtracted to decrease the motivation of the team, thereby making the team less alert.

(7) When the user team has scored another goal (four points or more ahead), a value somewhat greater than the value obtained in (6) or a randomly set value is subtracted.

(8) When the user team has scored a goal and gets close to the opposing team (only one point behind), a value nearly doubling the value i is added to enhance the motivation of the team.

(9) When the user team has scored a goal and gets close to the opposing team (two points behind), a value greater than the value i and smaller than the value set in (8) is added.

The above-described value to be added or subtracted is not directly added to or subtracted from the motivation level.

Instead, the value is first converted into the same order of the motivation level, and then, the converted value is added to or subtracted from the current motivation level. More specifically, the team parameters, such as the parameter [easily encouraged] (0, . . . , 3), first influence the above-mentioned value. That is, the above-described value is multiplied by the parameter coefficient and is then divided by three. The resulting value is then added to or subtracted from the current motivation level. This enables the team parameter, i.e., [easily encouraged], to be reflected in, i.e., to increase or decrease, the motivation level.

Details of the "motivation value calculation 3" are as follows. It should be noted that the scores indicated in the parentheses are expressed from the point of view of the user team.

1. First half (1) When the opposing team has scored a goal and tied the user team, the value, for example, 40, (hereinafter referred to as the "value j") is subtracted as the reference value. In a close game in which the difference in points of the user team and the opposing team is, for example, four or less, a value nearly doubling the value j may be subtracted, and if there is very little time left toward the end of the first half, an even greater value is subtracted to discourage the motivation of the team.

(2) When the opposing team has scored a goal and goes ahead of the user team after the scores were even, a value nearly doubling the value j or greater is subtracted.

(3) When the opposing team has scored a goal and goes ahead of the user team after the opposing team was once behind, a value somewhat greater than the value j is subtracted, thereby further discouraging the motivation of the team.

(4) When the opposing team has scored the first point, the value i is subtracted. If there is very little time left, a value somewhat smaller than the value j is subtracted.

(5) When the opposing team has scored another goal (two points behind), a value nearly doubling the value i is subtracted.

(6) When the opposing team has scored another goal (three points behind), a value somewhat greater than the value set in (5) is subtracted.

(7) When the opposing team has scored another goal (four points or more ahead), a value greater than the value set in (6) is subtracted. In this manner, the motivation of the user team is progressively discouraged with a greater number of points the opposing team has scored.

(8) When the opposing team has scored a goal and gets close to the user team (only one point ahead), the value i is subtracted.

(9) When the opposing team has scored a goal and gets close to the user team (only two points ahead), a value somewhat greater than the value i is subtracted.

2. Second half (1) When the opposing team has scored a goal and tied the user team, the value, for example, 150 (hereinafter referred to as the "value k"), is subtracted as the reference value. If there is very little time left toward the end of the game, a value nearly doubling the value k is subtracted, thereby discouraging the motivation of the team.

(2) When the opposing team has scored a goal and goes ahead of the user team after the scores were even, a value nearly one-half the value k is subtracted. If there is very little time left toward the end of the game, a value doubling the value k or even greater is subtracted. In this situation, a value on the order of the value k may be subtracted by considering the discouragement of the team when the opposing team has scored a goal and goes ahead of the user team after the user team was very close to the opposing team only one point behind.

(3) When the opposing team has scored a goal and goes ahead of the opposing team after the opposing team was once behind, a value somewhat greater than the value set in (1) is subtracted, thereby further discouraging the motivation of the team.

(4) When the opposing team has scored the first point, a value considerably smaller than the value k is subtracted.

(5) When the opposing team has scored another goal (two points behind), a value somewhat greater than the value set in (4) is subtracted.

(6) When the opposing team has scored another goal (three points behind), a value somewhat smaller than the value k is subtracted.

(7) When the opposing team has scored another goal (four points or more behind), the value k is subtracted. In this manner, the motivation of the user team is progressively discouraged with a greater number of points the opposing team has scored.

(8) When the opposing team has scored a goal and gets close to the user team (only one point ahead), a value on the order of the value j is subtracted.

(9) When the opposing team has scored a goal and gets close to the user team (only two points ahead), a value greater than the value j is subtracted.

3. Own goal

If the opposing team has scored the first point (4) due to an own goal, a value nearly doubling the value j is subtracted. Under the situations (1) through (3), and (5) through (7), the value to be subtracted is changed according to how many times an own goal has been scored, (first, second, or third time), that is, the value, ranging from a value greater than the value j to a value nearly doubling the value j, is subtracted according to the number of times an own goal has been scored. Similarly, under the situations (8) and (9), the value, ranging from a value on the order of the value j to a value nearly doubling the value j, is subtracted according to the number of times an own goal has been scored.

As discussed in the description of the "motivation value calculation 2", the above-described value is not directly subtracted from the motivation level. Instead, the value is first converted into a value on the same order of the motivation level, and the converted value is then subtracted from the current motivation level. More specifically, the team parameters, such as the parameters [easily discouraged] and [persistent] (0, . . . , 3), first influence the above-mentioned value. That is, if the parameter [persistent] is other than 0, a value somewhat smaller than the value j and a random value ranging from 0 to that value are added to the above-described value to be subtracted. (If the parameter [persistent] is 0, no values are added.) The resulting value is multiplied by the parameter coefficient [easily discouraged] and is then divided by three. The resultant value is then subtracted from the current motivation level. This enables the team parameters [easily discouraged] and [persistent] to be reflected in, i.e., to increase or decrease, the motivation level.

Details of the "motivation value calculation 4" are as follows.

Other situations, which may be encountered during the game, are considered. For example, during the halftime, the motivation level is decreased according to the score ahead of the opposing team (making the user team less careful), while the motivation level is increased according to the score behind than the opposing team (making the user team challenging). A greater value to be subtracted or added is set with a greater difference in points between the user team and the opposing team. A random value may further be added or subtracted, and thus, the game appears more realistic and powerful.

When one of the players of the user team is removed or substituted with another player due to injury or otherwise, an additional value is set by assuming that the motivation of the remaining players be increased.

Influences of the motivation level of the team on the individual players are as follows.

Each player has individual capabilities (characteristics), as shown in FIG. 5; decisiveness, shooting, the ability of curving a shot ball, speed, dashing, stamina, jumping, ball-keeping, defense, and passing, which are set by the value ranging from 0 to 99. The motivation level is converted into the ratio to 255 points and is used as the coefficient. The above capability is then multiplied by the coefficient. That is, if, for example, the player has a maximum of speed ability, i.e., 99, and if the motivation level is 128, the coefficient is calculated by the expression: 128/256=0.5. Then, the capability value 100 is multiplied by the coefficient 0.5, so that the speed ability is set to be 50. The other capabilities are similarly calculated. With this setting, however, if the motivation level is 0, some capability values may become 0 (the players are unable to perform the corresponding actions). Accordingly, the above coefficient may be multiplied by part of the player's capability value, for example, one-half the capability value. This guarantees at least one-half the player's capability value even if the motivation level is 0. For example, if the capability value is 80, at least one-half of the value, i.e., 40, is ensured.

Upon receiving various instructions to operate the player P1 (shown in FIGS. 7 and 8), the operation controlling portion 104 of the CPU 1 receives the above-described motivation level from the motivation-level setting portion 102 and multiplies the capability value relating to the instructed operation by the converted motivation level as a coefficient, thereby operating the player P1. The motivation level influences the players in the following manner. With a lower motivation level, the speed at which the player passes or cuts the ball is delayed, the timing at which the player conducts fore-check when drawing to an opposing player possessing a ball, or when grabbing a ball while facing an opposing player is delayed, and the speed at which the player draws to a loose ball is delayed. There is also an increased positional deviation from the player's own position, and the distance from an opposing player whom the player covers one-on-one is increased. Additionally, the timing at which attacking and defending is switched is delayed.

For example, delaying of the start timing can be expressed as follows. When an instruction is given to operate the player via the controller 8, a delay time, which is variable according to the player's capability and the motivation level, may be provided for the timing at which the instruction signal has been generated, and the instruction signal may be then output to the signal processor 9. Similarly, the speed may be changed by altering the speed of switching predetermined patterns of a running model or by increasing or decreasing the speed of switching the player's position (displayed on the monitor). In case of a decreased capability of the player, another operation model may be prepared, and the plurality of operation models may be appropriately used in response to the operation capability. For example, a running model may be switched to a walking model, or even to a model who has stopped and is gasping. A further modification may be made such that the player may easily commit fouls. In accordance with a decreased motivation level, a random range, which has been set to determine whether a fault is to be committed, is widened to increase the probability of committing a fault.

The motivation level influences not only the player who has been instructed to operate via the controller 8, but also other players under the control of the CPU 1. This enables the motivation level to be reflected in the entire team if a game is played in teams. For example, concerning the registered faults, the CPU 1 controls the players to easily commit such faults or controls the team to easily change its strategy, thereby disturbing the team play.

The present invention is applied to a game, such as a soccer game, in which players, i.e., human characters, are operated. However, the present invention may be applied to a game in which characters other than human characters, such as animals or intelligent robots, operate, insofar as the characters naturally possess motivation. As a game played in teams, not only a soccer game, but also a tag-team match of wrestling or team play of Judo, may be applied. In the present invention, not only team play, but 1P play, i.e., a single user playing the game, may be used, in which case, the motivation level of the single player operated by the user is solely used as the motivation level discussed above. Additionally, the present invention is not restricted to a soccer game, and may be applied to a baseball game, a basketball game, etc., in which case, the ball corresponding to the game is used.

As is seen from the foregoing description, the present invention offers the following advantages.

The video game machine of the present invention controls characters displayed on the monitor screen to perform various game-related operations in response to an instruction given via the controller. The game machine includes: situation determining means for determining whether a predetermined game-related situation has occurred; motivation-level setting means for setting the motivation level, influencing the character's operation, in response to an occurrence of the situation; and operation control means for controlling the character to perform the operation in accordance with the set motivation level. With this arrangement, it is possible to operate the character with its characteristics or capabilities in response to the type of situation, thereby providing an entertaining, realistic, and powerful game, which is different from a simple and unconditionally controlled game.

In the aforementioned game machine, a plurality of predetermined situations have been set, and the motivation-level setting means variously sets the motivation level for the character in response to an occurrence of the situation, thereby presenting a subtle variation in the player's operations.

The motivation-level setting means provides an initial motivation level to the character (player) before the start of the game, thereby providing a game reflecting the player's characteristics and capabilities. The motivation-level setting means adds or subtracts the current motivation level to or from the previous motivation level. Thus, simple computation is achieved over a conventional technique of calculating the motivation level every time a situation occurs.

If the game is played in teams, a plurality of characters of the user team and a plurality of characters of the opposing team are provided and compete against each other. Thus, the range of applications of the present invention covers from individual play games to team play games, that is, a wide range of games.

A ball item is displayed on the monitor screen, and in the game, the matching teams compete against each other by using the ball item. Accordingly, the present invention is applicable to games using balls.

The above-described game is a simulated soccer game in which the user team and the opposing team compete against each other for scores obtained by shooting the ball item. The controller operates one of the characters of the user team who is in possession of the ball item, and the computer controls t he remaining characters to operate according to instructions based on soccer game rules. In this manner, the present invention can be used in team play games, such as a soccer game, thereby presenting general versatility.

The characters of the opposing team are controlled by the computer according to instructions based on soccer game rules, as discussed above, thereby reducing the game user's load.

The present invention also includes team motivation-level storage means for storing information of the individual teams in relation to the motivation levels unique to the respective teams, and motivation-level indicating means for identifiably indicating the motivation level of the user team selected by the controller at a suitable position of the monitor screen, thereby enabling the user to visually check the motivation level. The motivation-level indicating means indicates the motivation level in color in accordance with its level, thereby enabling the user to quickly identify the motivation level and enhancing speedy operation.

The present invention further includes captaincy-suitability value storage means for storing the captaincy-suitability value unique to each character of the user team, and captain designating means for designating the captain. The motivation-level setting means variously sets the motivation level in response to the captaincy-suitability value set for the captain designated by the captain designating means. Accordingly, different motivation levels can be provided for the individual players within the same team, thereby making the game more interesting.

The motivation-level setting means adds or subtracts an extra value to or from the motivation level by considering the level of the opposing team, thereby presenting a careless or nervous atmosphere to the user team. If an instruction is given to change the captain during the game, the motivation-level setting means calculates the value obtained by multiplying the captaincy-suitability value of the current captain by a coefficient 1 or greater, and the value obtained by multiplying the captaincy-suitability value of each of the remaining characters by a coefficient smaller than the above coefficient, and adds all the calculated values. The same calculations are conducted to obtain the corresponding values for a newly selected captain. Then, the difference between the value obtained for the current captain and the value obtained for the newly selected captain is taken account of toward the motivation level of the user team. In this manner, the choice of captain is reflected in the team's motivation, thereby making the game more realistic.

The above-described predetermined situation, influencing the motivation level, may be scoring a goal. In this case, the motivation level of the user team is different according to whether the user team has scored a goal or the opposing team has scored a goal, or according to at which period of the game and under which situation a goal has been scored. Thus, the players' mental states can be suitably reflected in the game.

The motivation-level setting means variously sets the motivation level when a goal has been scored in accordance with the captaincy suitability value. Accordingly, the team's characteristics are appropriately presented when a goal has been scored depending on who has been selected as the captain.

Team-parameter storage means for storing the information of the individual teams in relation to their team parameters are also provided. The motivation level set by the motivation-level setting means when a goal has been scored is influenced by the team parameters of the user team, thereby presenting characteristics unique to the individual teams.

When setting the motivation level for the user team during halftime, the motivation-level setting means varies the motivation level according to whether the user team was ahead of the opposing team at the end of the first half of the game, thereby presenting the players' mental states during halftime.

The operation control means controls the characters to operate with speed or agility corresponding to the set motivation level, so that the motivation level is reflected in the game. It is thus possible to provide a highly sophisticated game based on actual soccer games.

According to the present invention, a video game method for use in the above type of video game machine and a computer-readable recording medium on which a game program implementing the above method is recorded are also applicable to the aforementioned modes.

What is claimed is:

1. A video game machine for a game in which a character displayed on a monitor screen performs various game-related operations in response to an instruction provided from a controller operated by a user, said video game machine comprising:

situation determining means for determining whether a predetermined situation, which is game-related, has occurred;

motivation-level setting means for setting a motivation level, as a numerical value which influences performances of an operation performed by the character, in response to an occurrence of the predetermined situation;

operation capability storage means for storing an operation capability value for the character which defines a capability to perform the operation;

operation control means for controlling the character, in response to the controller, to perform the operation in accordance with the operation capability of the character for the operation multiplied by the motivation level.

2. A video game machine according to claim 1, wherein:

the game includes a simulated soccer game having a user team including a plurality of characters which the user controls and competes for scores obtained by shooting a ball item, and an opposing team which competes against the user team and includes a plurality of characters;

said operation control means controls, in response to the user operating the controller, one of the characters of the user team in possession of the ball item; and a computer control means for controlling remaining ones of the characters of the user team to operate according to instructions based on soccer game rules.

3. A video game machine according to claim 2, wherein the characters of the opposing team are controlled by a computer according to instructions based on soccer game rules.

4. A video game machine according to claim 1, wherein said operation control means controls the character to operate at a speed corresponding to the motivation level.

5. A video game machine according to claim 1, wherein said operation control means controls the character to operate with an agility corresponding to the motivation level.

6. A video game machine for a game in which a character displayed on a monitor screen performs various game-related operations in response to an instruction provided from a controller operated by a user, the game having a user team formed of a plurality of characters including the character responding to the controller, and an opposing team formed of a plurality of characters competing against the user team, said video game machine comprising:

situation determining means for determining whether a predetermined situation, which is game-related, has occurred;

motivation-level setting means for setting a motivation level, which influences a character's operation, in response to an occurrence of the predetermined situation;

operation control means for controlling the character, in response to the controller, to perform an operation in accordance with the motivation level;

team motivation-level storage means for storing information for a plurality of teams in relation to motivation levels unique to respective ones of said plurality of teams; and motivation-level indicating means for indicating, at a suitable portion of said monitor screen, the motivation level corresponding to the user team selected by said controller.

7. A video game machine according to claim 6, wherein said motivation-level indicating means indicates the motivation level as a color corresponding to the motivation level.

8. A video game machine for a game in which a character displayed on a monitor screen performs various game-related operations in response to an instruction provided from a controller operated by a user, said video game machine comprising:

situation determining means for determining whether a predetermined situation, which is game-related, has occurred;

motivation-level setting means for setting a motivation level, which influences a character's operation, in response to an occurrence of the predetermined situation;

operation control means for controlling the character, in response to the controller, to perform an operation in accordance with the motivation level;

the game having a user team formed of a plurality of characters including the character responding to the controller, and an opposing team formed of a plurality of characters competing against the user team;

captaincy-suitability value storage means for storing a captaincy-suitability value unique to each of the characters of the user team;

captain designating means for designating a captain; and said motivation-level setting means setting the motivation level in accordance with the captaincy-suitability value set for the captain designated by said captain designating means.

9. A video game machine for a game in which a character displayed on a monitor screen performs various game-related operations in response to an instruction provided from a controller operated by a user, said video game machine comprising:

situation determining means for determining whether a predetermined situation, which is game-related, has occurred;

motivation-level setting means for setting a motivation level, which influences a character's operation, in response to an occurrence of the predetermined situation;

operation control means for controlling the character, in response to the controller, to perform an operation in accordance with the motivation level;

the game having a user team formed of a plurality of characters including the character responding to the controller, and an opposing team formed of a plurality of characters competing against the user team;

captaincy-suitability value storage means for storing a captaincy-suitability value unique to each of the characters of the user team;

captain designating means for designating a captain;

said controller having means for inputting an instruction to change the captain during the game permitting selection of a newly selected captain; and said motivation-level setting means including means for adding:
   a value obtained by multiplying the captaincy-suitability value of a current captain by a coefficient k; and
   a value obtained by multiplying the captaincy-suitability value of each of the remaining characters of the user team by a coefficient smaller than the coefficient k to obtain a first added value; and also for adding:
   a value obtained by multiplying the captaincy-suitability value of said newly selected captain by a coefficient k; and
   a value obtained by multiplying the captaincy-suitability value of each of the remaining characters of the user team by a coefficient smaller than the coefficient k to obtain a second added value; and for calculating a difference between the first added value for the current captain and the second added value for the newly selected captain and adding the difference to the motivation level of the user team.

10. A video game machine for a game in which a character displayed on a monitor screen performs various game-related operations in response to an instruction provided from a controller operated by a user, said video game machine comprising:

situation determining means for determining whether a predetermined situation, which is game-related, has occurred, wherein the predetermined situation is scoring a goal;

motivation-level setting means for setting a motivation level, which influences a character's operation, in response to an occurrence of the predetermined situation;

operation control means for controlling the character, in response to the controller, to perform an operation in accordance with the motivation level;

the game having a user team formed of a plurality of characters including the character responding to the controller, and an opposing team formed of a plurality of characters competing against the user team; and said motivation-level setting means includes means for varying the motivation level set for the user team according to a period of the game during which the goal is scored.

11. A video game machine for a game in which a character displayed on a monitor screen performs various game-related operations in response to an instruction provided from a controller operated by a user, said video game machine comprising:

situation determining means for determining whether a predetermined situation, which is game-related, has occurred, wherein the predetermined situation is scoring a goal;

motivation-level setting means for setting a motivation level, which influences a character's operation, in response to an occurrence of the predetermined situation;

operation control means for controlling the character, in response to the controller, to perform an operation in accordance with the motivation level;

the game having a user team formed of a plurality of characters including the character responding to the controller, and an opposing team formed of a plurality of characters competing against the user team;

captaincy-suitability value storage means for storing a captaincy-suitability value unique to each of the characters of the user team;

captain designating means for designating a captain; and said motivation-level setting means includes means for varying the motivation level, set when the goal is scored, in accordance with the captaincy-suitability value.

12. A video game machine for a game in which a character displayed on a monitor screen performs various game-related operations in response to an instruction provided from a controller operated by a user, said video game machine comprising:

situation determining means for determining whether a predetermined situation, which is game-related, has occurred;

motivation-level setting means for setting a motivation level, which influences a character's operation, in response to an occurrence of the predetermined situation;

operation control means for controlling the character, in response to the controller, to perform an operation in accordance with the motivation level;

the game having a user team formed of a plurality of characters including the character responding to the controller, and an opposing team formed of a plurality of characters competing against the user team; and said motivation-level setting means including means for variously setting the motivation level during halftime according to whether the user team is ahead at an end of a first half of the game.

13. A video game machine for a game in which a team includes a plurality of characters displayed on a monitor screen and a character of the plurality of characters is displayed on the monitor screen performing various game-related operations in response to an instruction provided from a controller operated by a user, said video game machine comprising:

situation determining means for determining whether a predetermined situation, which is game-related, has occurred;

motivation-level setting means for setting a motivation level of said team, which influences performances of an operation performed by the character, in response to an occurrence of the predetermined situation;

motivation level indicating means for displaying, on the monitor screen, the motivation level corresponding to the team;

operation control means for controlling the character, in response to the controller, to perform the operation in accordance with the operation capability of the character for the operation multiplied by the motivation level.

14. A video game machine for a game in which a team includes a plurality of characters displayed on a monitor screen and a character of the plurality of characters is displayed on the monitor screen performing various game-related operations in response to an instruction provided from a controller operated by a user, said video game machine comprising:

situation determining means for determining whether a predetermined situation, which is game-related, has occurred, the predetermined situation including selection of one of the plurality of characters as a team captain;

motivation-level setting means for setting a motivation level, which influences performances of an operation performed by the character, in response to an occurrence of the predetermined situation;

means for permitting the user to select one of the plurality of characters as the team captain; and operation control means for controlling the character, in response to the controller, to perform an operation in accordance with the motivation level.

* * * * *